(12) United States Patent
Buxton (10) Patent No.: US 9,873,195 B1
(45) Date of Patent: Jan. 23, 2018

(54) SOCKET ORGANIZER (71) Applicant: Jeffrey Buxton, Bergholz, OH (US)

(72) Inventor: Jeffrey Buxton, Bergholz, OH (US)

( * ) Notice: Subject to any disclaimer, the term of this patent is extended or adjusted under 35 U.S.C. 154(b) by 0 days.

(21) Appl. No.: 15/458,128

(22) Filed: Mar. 14, 2017

Related U.S. Application Data (60) Provisional application No. 62/309,253, filed on Mar. 16, 2016.

(51) Int. Cl.
*B25H 3/00* (2006.01)
*B25H 3/04* (2006.01)
*F16B 1/00* (2006.01)

(52) U.S. Cl.
CPC .............. *B25H 3/003* (2013.01); *B25H 3/04* (2013.01); *F16B 1/00* (2013.01); *F16B 2001/0035* (2013.01)

(58) Field of Classification Search
CPC . B65H 3/003; B65H 3/06; B65H 3/04; B65H 3/028; B65H 3/02; B65H 3/023; B65H 13/56; Y10S 206/818; B25B 13/56
USPC ............ 206/372, 373, 376, 377, 378, 379
See application file for complete search history.

(56) References Cited

U.S. PATENT DOCUMENTS

| | | | | | |
|---|---|---|---|---|---|
| 4,621,738 | A * | 11/1986 | DeLucchi | ............... | B25H 3/003 206/378 |
| 5,316,143 | A * | 5/1994 | Horn | ................. | B25H 3/06 206/350 |
| 5,456,359 | A * | 10/1995 | Horn | ................. | B25H 3/06 206/350 |
| 5,544,747 | A * | 8/1996 | Horn | ................. | B25H 3/06 206/350 |
| 5,560,480 | A * | 10/1996 | Singleton | ............. | B65D 25/101 206/373 |
| 5,669,516 | A * | 9/1997 | Horn | ................. | B25H 3/06 206/350 |
| 6,006,906 | A * | 12/1999 | Winnard | .................. | B25H 3/06 206/350 |
| 6,039,188 | A * | 3/2000 | Lee | ........................ | B25H 3/04 206/378 |
| 8,152,003 | B1 * | 4/2012 | Kao | ........................ | B25H 3/04 211/70.6 |
| 2002/0125158 | A1 * | 9/2002 | High | ...................... | B65D 85/00 206/370 |
| 2004/0031710 | A1 * | 2/2004 | K | ........................ | B65D 25/282 206/378 |
| 2007/0074985 | A1 * | 4/2007 | Evans | .................... | B25H 3/003 206/376 |

* cited by examiner

*Primary Examiner* — Patrick D Hawn (57) ABSTRACT

The socket organizer is a storage apparatus for a socket set. The socket organizer allows for the direct attachment of a socket to the socket organizer directly from a ratchet to which the socket may be attached. The socket is removably attached to the socket organizer such that a ratchet may be directly attached to the socket while the socket is stored on the socket organizer. The socket organizer comprises a base and a socket stand. The socket stand is removably attached to the base. The socket stand further comprises a plurality of socket pedestals. Each of the plurality of pedestals is a pedestal upon which a socket selected from a socket set is stored.

1 Claim, 5 Drawing Sheets

SOCKET ORGANIZER

CROSS REFERENCES TO RELATED APPLICATIONS

This non-provisional application claims priority under 35 USC 119(e) to United States provisional application U.S. 62/309,253 filed on Mar. 18, 2016 by the inventor: Jeffery A. Buxton of Bergholz, Ohio.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hand tools and workshop equipment, more specifically, a storage arrangement to facilitate access to work tools or instruments.

SUMMARY OF INVENTION

The socket organizer is a storage apparatus for a socket set. The socket organizer allows for the direct attachment of a socket to the socket organizer directly from a ratchet to which the socket may be attached. The socket is removably attached to the socket organizer such that a ratchet may be directly attached to the socket while the socket is stored on the socket organizer. The socket organizer comprises a base and a socket stand. The socket stand is removably attached to the base. The socket stand may be detached from the base for the purpose of bringing the entire socket set to a work site that is not local to the workstation where the socket organizer is maintained. The socket stand and the base may be taken to a job site and put on a magnetic surface. The socket stand further comprises a plurality of socket pedestals. Each of the plurality of pedestals is a pedestal upon which a socket selected from a socket set is stored.

These together with additional objects, features and advantages of the socket organizer will be readily apparent to those of ordinary skill in the art upon reading the following detailed description of the presently preferred, but nonetheless illustrative, embodiments when taken in conjunction with the accompanying drawings.

In this respect, before explaining the current embodiments of the socket organizer in detail, it is to be understood that the socket organizer is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the socket organizer.

It is therefore important that the claims be regarded as including such equivalent construction insofar as they do not depart from the spirit and scope of the socket organizer. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
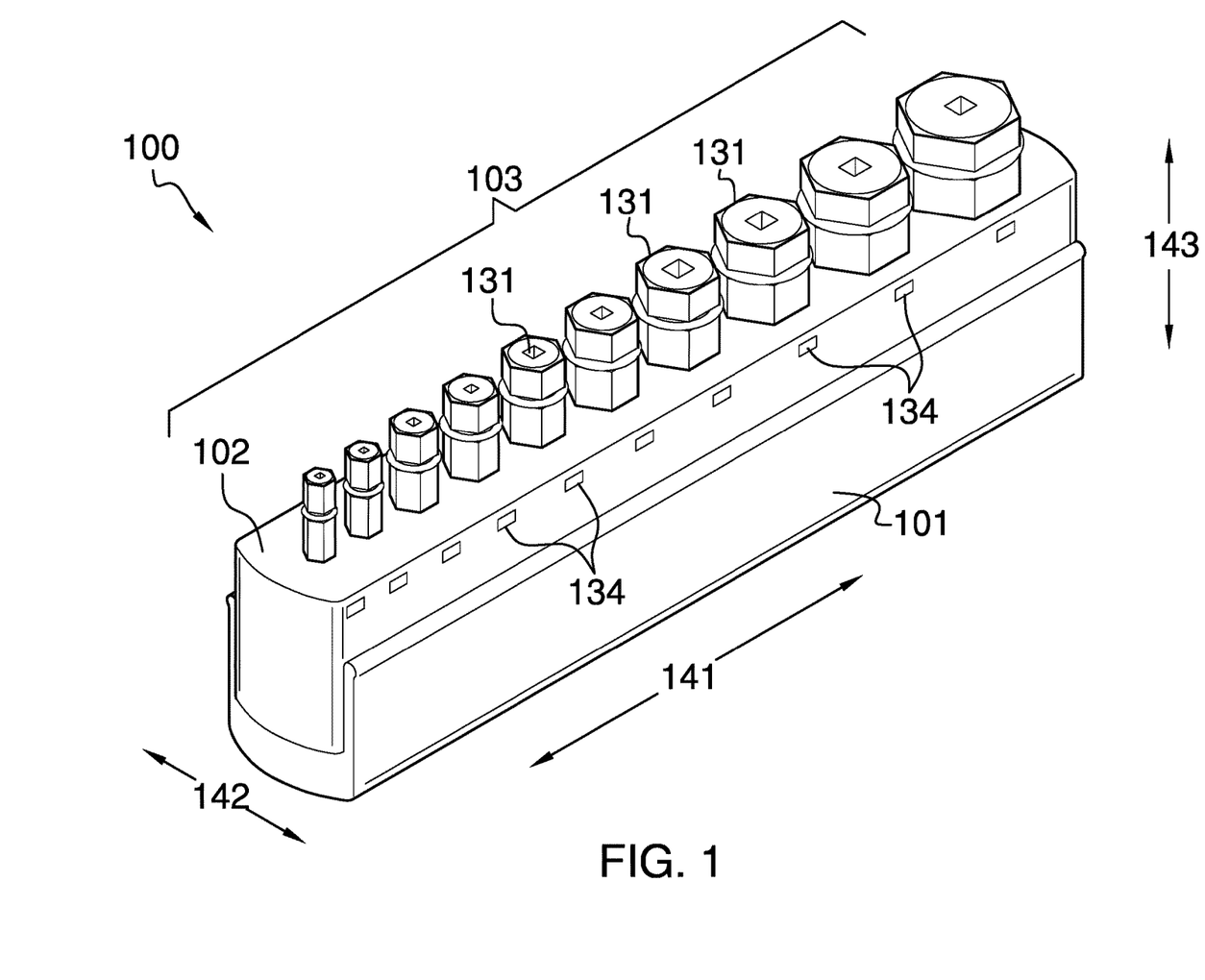
FIG. 1 is a perspective view of an embodiment of the disclosure.
Figure 2:
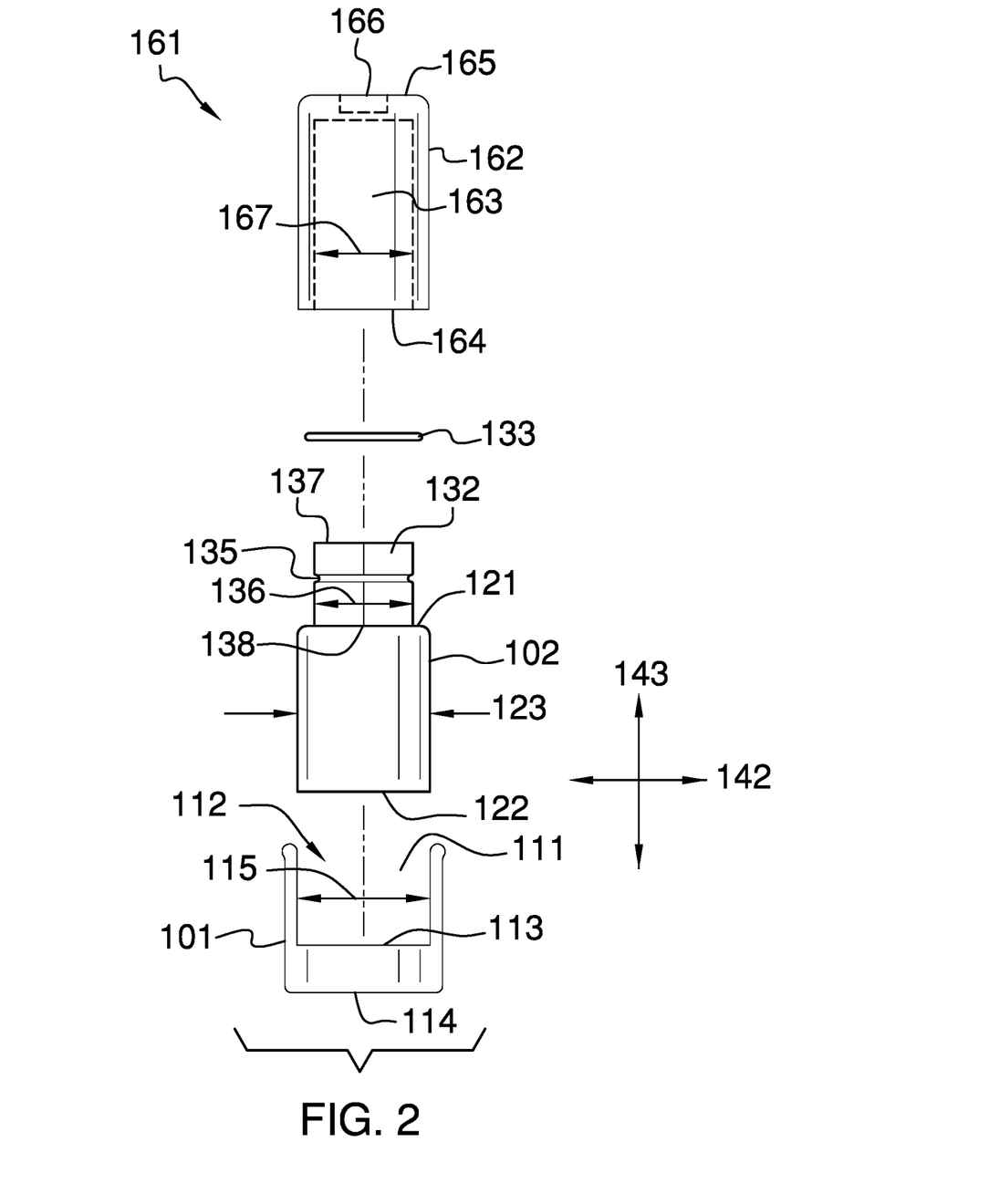
FIG. 2 is an exploded view of an embodiment of the disclosure.
Figure 3:
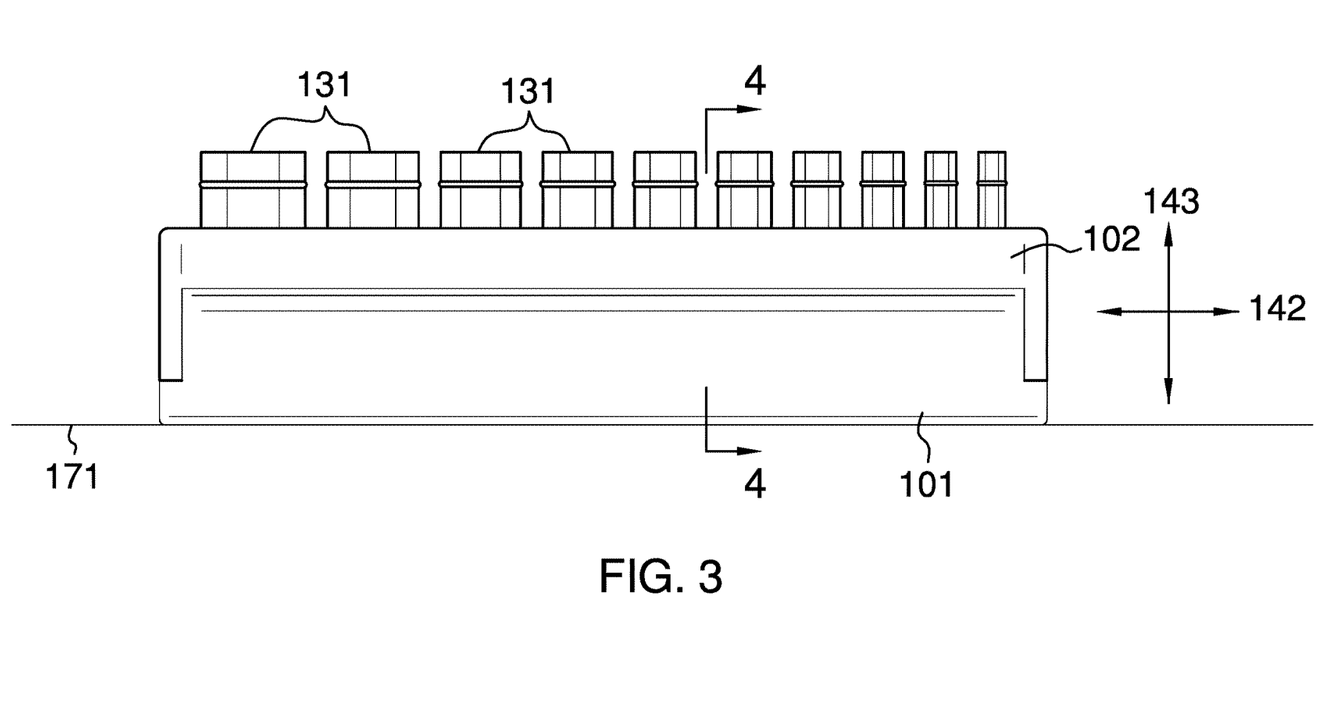
FIG. 3 is a side view of an embodiment of the disclosure.
Figure 4:
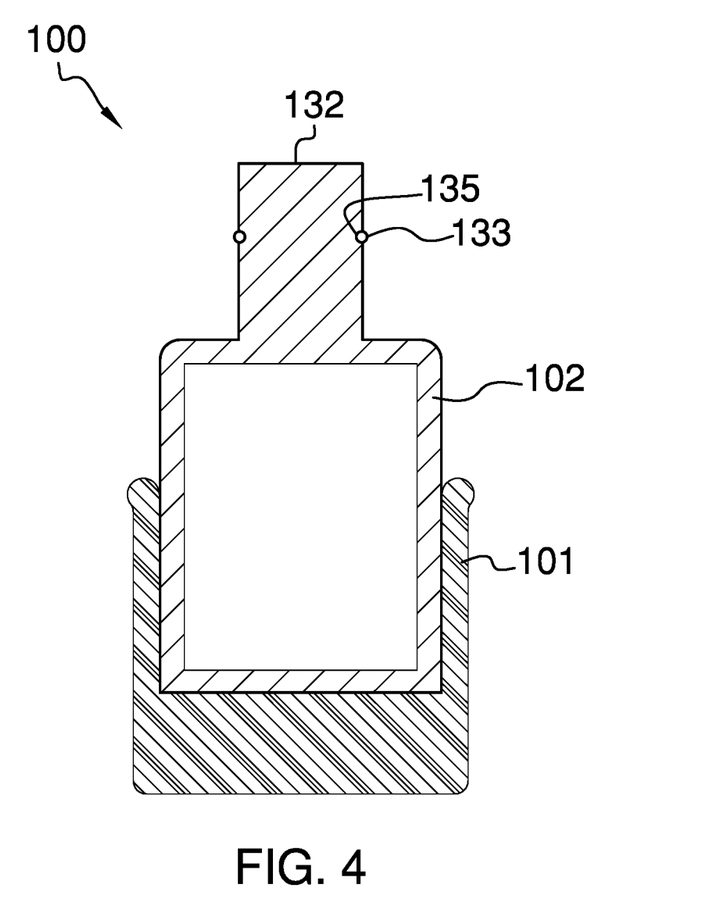
FIG. 4 is a cross-sectional view of an embodiment of the disclosure across 4-4 as shown in FIG. 3.
Figure 5:
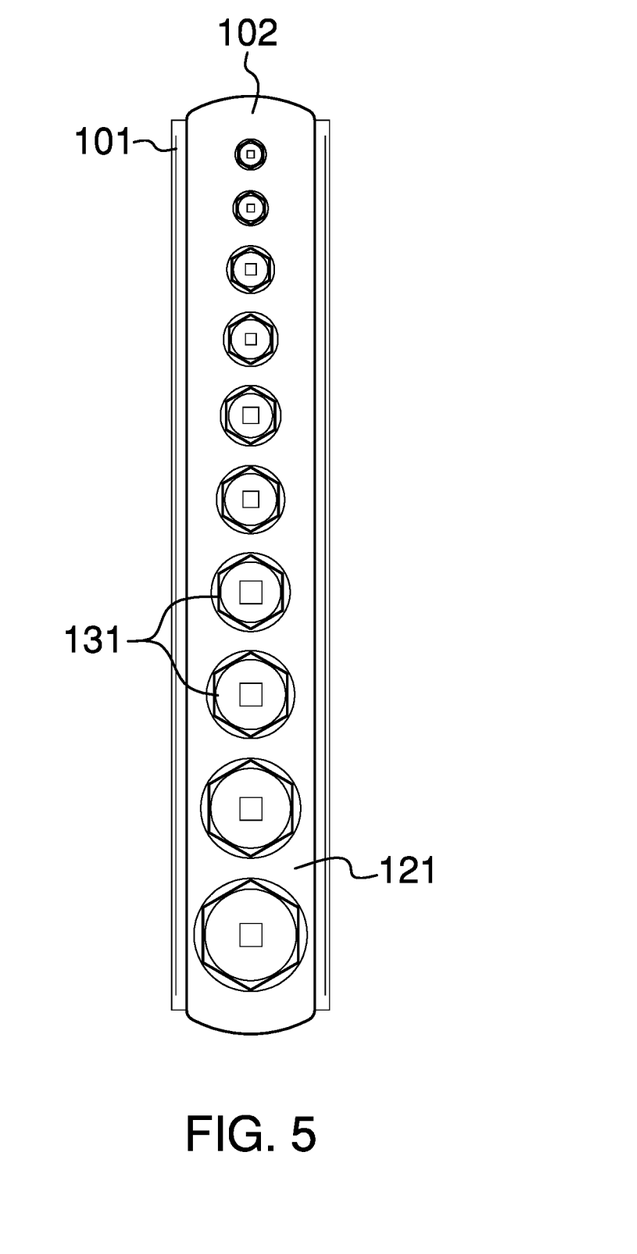
FIG. 5 is a top view of an embodiment of the disclosure.

Detailed reference will now be made to one or more potential embodiments of the disclosure, which are illustrated in FIGS. 1 through 5.

The socket organizer 100 (hereinafter invention) is a storage apparatus for a socket 161 set. The invention 100 allows for the direct attachment of a socket 161 to the invention 100 directly from a ratchet to which the socket 161 is attached. The socket 161 is removably attached to the invention 100 such that a ratchet may be directly attached to the socket 161 while the socket 161 is stored on the invention 100. The invention 100 comprises a base 101 and a socket 161 stand 102. The socket 161 stand 102 is removably attached to the base 101. The socket 161 stand 102 may be detached from the base 101 for the purpose of bringing the entire socket 161 set to a work site that is not local to the workstation where the invention 100 is maintained. The socket 161 stand 102 further comprises a plurality of pedestals 103. Each of the plurality of pedestals 103 is a pedestal upon which a socket 161 selected from a socket 161 set is stored.

The socket 161 is a commercially available socket that is commonly used with a ratchet to install bolts into a threaded connection. The socket 161 is further defined with a cylinder 162, a countersink 163, a bolt end 164, a ratchet end 165, and a ratchet port 166. The countersink 163 is further defined with an inner dimension 167.

The cylinder 162 is the outer shell of the socket 161. The countersink 163 is a cavity that is formed within the cylinder 162. A bolt is inserted into the countersink 163 during normal use of the socket 161. The bolt end 164 is face of the socket 161 that receives the bolt. The ratchet end 165 is the face of the cylinder 162 that is distal from the bolt end 164. The ratchet port 166 is a port that is formed in the ratchet end 165 of the socket 161 that receives the ratchet plug to attach the socket 161 to the ratchet. The inner dimension 167 is the physical measure of the diameter of the countersink 163.

The invention 100 is further defined with a length direction 141, a width direction 142, and a height direction 143. The length direction 141, the width direction 142 and the height direction 143 are mutually perpendicular.

The base 101 is a hollow rectangular block structure that is formed with three open faces. The three open faces form a slot into which the socket 161 stand 102 is inserted for storage. As shown most clearly in FIG. 1, the three open faces are: 1) the superior plane formed along the length direction 141 and the width direction 142; and, 2) the two lateral planes formed along the width direction 142 and the height direction 143. The base 101 is formed with magnetic properties that allows the base 101 to attach itself to a surface that is made from a magnetic material. The base 101 comprises a groove 111.

The base 101 is further defined with an open face 112, a first superior face 113, and a first inferior face 114. The open face 112 of the base 101 is the face of the rectangular block that forms the base 101 that is distal from the first inferior face 114. The first superior face 113 of the base 101 is the inferior surface of the groove 111. The first superior face 113 is the superior surface of the inferior plate of the base 101 that is distal from the first inferior face 114. The first inferior face 114 is the face of the base 101 that is placed on the supporting surface 171 upon which the invention 100 is in use.

The groove 111 is a slot that is formed within the base 101. The groove 111 is further defined with an inner width dimension 115. The inner width dimension 115 is the interior dimension (or inner dimension) of the groove 111 as measured in the width direction 142.

The socket 161 stand 102 is a rectangular block structure upon which the socket 161 set is mounted. The socket 161 stand 102 is formed from a magnetic material such that the socket 161 stand 102 will magnetically attach to the base 101. As shown most clearly in FIG. 2, the socket 161 stand 102 fits into the base 101 in the manner of a tongue and groove. The socket 161 stand 102 further comprises a plurality of pedestals 103. The socket 161 stand 102 is further defined with a second superior face 121, a second inferior face 122, and an outer width dimension 123. The second superior face 121 is the superior surface of the socket 161 stand 102 when the invention 100 is used normally. The second inferior face 122 is the face of the socket 161 stand 102 that is distal from the second superior face 121. The second inferior face 122 is placed against the first superior face 113 when the socket 161 stand 102 is inserted into the base 101.

The outer width dimension 123 is the outer dimension of the socket 161 stand 102 as measured in the width direction 142. The inner width dimension 115 of the groove 111 is sized such that the groove 111 will receive the socket 161 stand 102.

The plurality of pedestals 103 are mounted on the second superior face 121.

Each of the plurality of pedestals 103 is a post that projects perpendicularly away from the second superior face 121 of the socket 161 stand 102. The post formed by any pedestal selected from the plurality of pedestals 103 is inserted into the countersink 163 of the socket 161. The plurality of pedestals 103 contains a collection of individual pedestals 131. Each individual pedestal 131 is the post of the plurality of pedestals 103 that is intended to be inserted into the socket 161.

The individual pedestal 131 comprises a polygonal prism 132, a gasket 133, and a label 134. The post is formed in the shape of a polygonal prism 132. The center axis of the polygonal prism 132 projects perpendicularly away from the second superior face 121. The selected polygon that forms the polygonal prism 132 is selected to match the polygon shape that forms the countersink 163. The most common polygons used with socket sets are metric hexagons and SAE hexagons.

The polygonal prism 132 is further defined with an outer dimension 136, a first parallel face 137, and a second parallel face 138. Any first pedestal selected from the plurality of pedestals 103 is differentiated from any second pedestal selected from the plurality of pedestals 103 by the outer dimension 136 of the polygonal prism 132. The outer dimension 136 is the physical measure of the diameter of the polygonal prism 132. The first parallel face 137 is the parallel face of the polygonal prism 132 that is distal from the second superior face 121. The second parallel face 138 is the parallel face of the polygonal prism 132 that attaches to the second inferior face 122. The countersink 163 is placed over the first parallel face 137.

The gasket 133 is a ring that is formed from an elastomeric material. The gasket 133 is placed around the non-parallel faces of the polygonal prism 132. The gasket 133 acts as a non-skid material that is positioned between the countersink 163 of the socket 161 and the polygonal prism 132 such that the friction of the gasket 133 against the countersink 163 will hold the socket 161 in position.

The polygonal prism 132 further comprises a gasket groove 135. The gasket groove 135 is a slot that is formed around the perimeter formed by the non-parallel faces of the polygonal prism 132. The plane formed by the gasket groove 135 is perpendicular to the center axis of the polygonal prism 132. The gasket 133 is fitted into the gasket groove 135. The forces that prevents the gasket 133 from returning to its relaxed shape will further hold the gasket 133 in position.

The label 134 is an image that is displayed in the vicinity of its polygonal prism 132. It is anticipated that the sentiment displayed by the label 134 will signify the size of the diameter of the countersink 163 that the polygonal prism 132 is configured to receive.

The span of the inner dimension 167 is greater than the span of the outer dimension 136 such that the polygonal prism 132 may be inserted into the countersink 163. With this arrangement, the socket 161 may be placed onto and removed from the polygonal prism 132 while the ratchet is attached to the socket 161. Depending on the ratchet used, this operation can be accomplished with a single free hand.

The following definitions were used in this disclosure:

Cavity: As used in this disclosure, a cavity is an empty space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Countersink: As used in this disclosure, a countersink refers to the cavity in the socket head of a socket wrench into which the head of the bolt is inserted.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Diameter: As used in this disclosure, a diameter of an object is a straight line segment that passes through the center of an object. The line segment of the diameter is terminated at the perimeter or boundary of the object through which the line segment of the diameter runs.

Display: As used in this disclosure, a display is a surface upon which is presented an image.

Elastic: As used in this disclosure, an elastic is a material or object that deforms when a force is applied to it and that is able to return to its original shape after the force is removed. A material that exhibits these qualities is also referred to as an elastomeric material.

Gasket: As used in this disclosure, a gasket is an elastomeric material that is placed between a first surface and a second surface for the purpose of: 1) creating a liquid or gas impermeable seal between the first surface and the second surface; or, 2) preventing the first surface from damaging the second surface (or vice versa).

Image: As used in this disclosure, an image is an optical representation or reproduction of a sentiment or of the appearance of something or someone. See sentiment.

Inferior: As used in this disclosure, the term inferior refers to a directional reference that is parallel to and in the same direction as the force of gravity.

Inner Dimension: As used in this disclosure, the term inner dimension describes the span from a first inside or interior surface of a container to a second inside or interior surface of a container. The term is used in much the same way that a plumber would refer to the inner diameter of a pipe.

Magnet: As used in this disclosure, a magnet is an ore, alloy, or other material that has its component atoms arranged so the material exhibits properties of magnetism such as attracting other iron-containing objects or aligning itself in an external magnetic field.

Magnetic Material: As used in this disclosure, a magnetic material is a substance that attracts or is attracted to a magnet but that itself has no net magnetic moment (beyond any residual moment created by prior use). Common classes of magnetic materials include ferromagnetic, diamagnetic, paramagnetic, ferrimagnetic and antiferromagnetic.

Non-Skid Material: As used in this disclosure, a non-skid material is a commercially available product that can be applied to an object such that the object is inhibited from sliding along the surface upon which the object is resting.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pedestal: As used in this disclosure, a pedestal is an intermediary load bearing structure that is placed between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Plate: As used in this disclosure, a plate is a smooth, flat and semi-rigid or rigid structure that has at least one dimension that: 1) is of uniform thickness; and 2) that appears thin relative to the other dimensions of the object. Plates often have a rectangular or disk like appearance.

Port: As used in this disclosure, a port is a cavity that is formed in an object that is adapted to receive a plug.

Prism: As used in this disclosure, a prism is a 3 dimensional geometric structure wherein: 1) the form factor of two faces of the prism correspond to each other; and, 2) the two corresponding faces are parallel to each other. In this disclosure, when further description is required a prism will be named for the geometric or descriptive name of the form factor of the two corresponding faces. If the form factor of the two corresponding faces has no clearly established or well-known geometric or descriptive name, the term irregular prism will be used. The center axis of a prism is defined as a line that joins the center point of the first corresponding face of the prism to the center point of the second corresponding face of the prism. The center axis of a prism is otherwise analogous the center axis of a cylinder.

Ratchet: As used in this disclosure, a ratchet is a device comprising a pawl or hinged catch that engages the sloping teeth of a wheel or bar permitting motion in one direction only.

Rectangular Block: As used in this disclosure, a rectangular block refers to a three dimensional structure comprising six rectangular surfaces formed at right angles. Within this disclosure, a rectangular block may further comprises rounded edges and corners.

Relaxed Shape: As used in this disclosure, a structure is considered to be in its relaxed state when no shear, strain, or torsional forces are being applied to the structure.

Ring: As used in this disclosure, a ring is term that is used to describe a flat or plate like structure through which an aperture is formed.

SAE: As used in this disclosure, SAE is an acronym that stands for an organization called the Society of Automotive Engineers. The SAE defines standard tool sizes that are measured as fractions of an inch.

Sentiment: As used in this disclosure, a sentiment is an image, potentially including a text based image, which contains some form of symbolic meaning or message.

Slot: As used in this disclosure, a slot is a long narrow groove or aperture that is formed in an object.

Socket: As used in this disclosure, a socket is an opening or a cavity that acts as a receptacle for an inserted part.

Superior: As used in this disclosure, the term superior refers to a directional reference that is parallel to and in the opposite direction of the force of gravity.

Supporting Surface: As used in this disclosure, a supporting surface is a horizontal surface upon which an object is placed. Within this disclosure, it is assumed that the object is placed on the supporting surface in an orientation that is appropriate for the normal or anticipated use of the object.

Threaded Connection: As used in this disclosure, a threaded connection is a type of fastener that is used to join a first tube shaped and a second tube shaped object together. The first tube shaped object is fitted with fitted with a first fitting selected from an interior screw thread or an exterior screw thread. The second tube shaped object is fitted with the remaining screw thread. The tube shaped object fitted with the exterior screw thread is placed into the remaining tube shaped object such that: 1) the interior screw thread and the exterior screw thread interconnect; and, 2) when the tube shaped object fitted with the exterior screw thread is rotated the rotational motion is converted into linear motion that moves the tube shaped object fitted with the exterior screw thread either into or out of the remaining tube shaped object. The direction of linear motion is determined by the direction of rotation.

Tongue and Groove Joint: As used in this disclosure, a tongue and groove joint is a joint that is used to fasten a first plate or board to second plate or board. together. The groove portion of the tongue and groove joint is a groove that is formed in an edge of the first plate or board. The tongue portion of the tongue and groove joint is a ridge that is formed on the edge of the second plate or board. The tongue portion of the tongue and groove joint is sized and shaped such that the tongue portion of the tongue and groove joint can be inserted into the groove portion of the tongue and groove joint thus attaching the first plate or board to the second plate or board.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A storage arrangement comprising:
a base and a socket stand;
wherein the socket stand is removably attached to the base;
wherein the storage arrangement is a storage apparatus for a socket set;
wherein the storage arrangement allows for the direct attachment of a socket to the storage arrangement;
wherein the socket is removably attached to the storage arrangement such that a ratchet may be directly attached to the socket while the socket is stored on the storage arrangement;
wherein the storage arrangement is further defined with a length direction, a width direction, and a height direction;
wherein the length direction, the width direction and the height direction are mutually perpendicular;
wherein the socket stand further comprises a plurality of pedestals;
wherein each of the plurality of pedestals is a pedestal upon which a socket selected from a socket set is stored;
wherein the socket is further defined with a cylinder, a countersink, a bolt end, a ratchet end, and a ratchet port;
wherein the countersink is further defined with an inner dimension;
wherein a bolt is configured to be inserted into the countersink during use of the socket;
wherein the base is a hollow rectangular block structure;
wherein the base is formed with a first open face, a second open face, and a third open face;
wherein the first open face is the superior plane formed along the length direction and the width direction;
wherein the second and third open faces are formed by the two lateral planes formed along the width direction and the height direction;
wherein the base is formed with magnetic properties;
wherein the magnetic properties of the base are such that the base attaches itself to a surface that is made from a magnetic material;
wherein the base comprises a groove;
wherein the three open faces forms the groove;
wherein the groove is a slot that is formed within the base;
wherein the groove is a slot into which the socket stand is inserted;
wherein the base is further defined with a first superior face, and a first inferior face;
wherein the first open face of the base is the face of the rectangular block that forms the base that is distal from the first inferior face;
wherein the first superior face of the base is the inferior surface of the groove;
wherein the first superior face is the superior surface of the inferior plate of the base that is distal from the first inferior face;
wherein the groove is further defined with an inner width dimension;
wherein the inner width dimension is the interior dimension of the groove as measured in the width direction;
wherein the socket stand is a rectangular block structure;
wherein the socket stand is further defined with a second superior face, a second inferior face, and an outer width dimension;
wherein the second superior face is the superior surface of the socket stand when the storage arrangement is used normally;
wherein the second inferior face is the face of the socket stand that is distal from the second superior face;
wherein the second inferior face is placed against the first superior face when the socket stand is inserted into the base;
wherein the outer width dimension is the outer dimension of the socket stand as measured in the width direction;
wherein the inner width dimension of the groove is sized such that the groove will receive the socket stand;
wherein the socket stand is formed from a magnetic material such that the socket stand magnetically attaches to the base;
wherein the socket stand fits into the groove of the base;
wherein the plurality of pedestals are mounted on the second superior face;
wherein each of the plurality of pedestals is a post that projects perpendicularly away from the second superior face of the socket stand;

wherein the plurality of pedestals contains a collection of individual pedestals;
wherein each individual pedestal is the post of the plurality of pedestals that is intended to be inserted into the socket;
wherein the individual pedestal comprises a polygonal prism, a gasket;
wherein the gasket attaches to the polygonal prism;
wherein a label is attached to the socket stand at a location in the vicinity of the individual pedestal;
wherein the polygonal prism is a post;
wherein the center axis of the polygonal prism projects perpendicularly away from the second superior face;
wherein the selected polygon that forms the polygonal prism is selected to match the polygon shape that forms the countersink;
wherein the polygonal prism is further defined with an outer dimension, a first parallel face, and a second parallel face;
wherein any first pedestal selected from the plurality of pedestals is differentiated from any second pedestal selected from the plurality of pedestals by the outer dimension of the polygonal prism;
wherein the first parallel face is the parallel face of the polygonal prism that is distal from the second superior face;
wherein the second parallel face is the parallel face of the polygonal prism that attaches to the second inferior face;
wherein the countersink is placed over the first parallel face;
wherein the gasket is a ring that is formed from an elastomeric material;
wherein the gasket is placed around the non-parallel faces of the polygonal prism;
wherein the polygonal prism further comprises a gasket groove;
wherein the gasket groove is a slot that is formed around the perimeter formed by the non-parallel faces of the polygonal prism;
wherein the plane formed by the gasket groove is perpendicular to the center axis of the polygonal prism;
wherein the gasket is fitted into the gasket groove;
wherein the gasket is sized such that the forces that prevents the gasket from returning to its relaxed shape will further hold the gasket in position;
wherein the span of the inner dimension is greater than the span of the outer dimension such that the polygonal prism may be inserted into the countersink;
wherein the label is an image that is displayed in the vicinity of its polygonal prism;
wherein the socket may be placed onto and removed from the polygonal prism while the ratchet is attached to the socket.

* * * * *